US009239260B2

(12) United States Patent
Bayha et al.

(10) Patent No.: US 9,239,260 B2
(45) Date of Patent: Jan. 19, 2016

(54) OPTICAL MEASURING DEVICE

(71) Applicant: VALEO Schalter und Sensoren GmbH, Bietigheim-Bissingen (DE)

(72) Inventors: Heiner Bayha, Satow OT Clausdorf (DE); Peter Horvath, Vaihingen A. D. Enz (DE); Jens Nicolai, Neupetershain (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 58 days.

(21) Appl. No.: 14/361,161

(22) PCT Filed: Nov. 15, 2012

(86) PCT No.: PCT/EP2012/072715
§ 371 (c)(1),
(2) Date: May 28, 2014

(87) PCT Pub. No.: WO2013/079331
PCT Pub. Date: Jun. 6, 2013

(65) Prior Publication Data
US 2014/0332676 A1    Nov. 13, 2014

(30) Foreign Application Priority Data

Nov. 29, 2011  (DE) .......................... 10 2011 119 707

(51) Int. Cl.
*G01S 7/481*     (2006.01)
*G01J 1/04*      (2006.01)
(Continued)

(52) U.S. Cl.
CPC ............. *G01J 1/0407* (2013.01); *G01S 7/4813* (2013.01); *G01S 7/4817* (2013.01); *G02B 26/105* (2013.01); *G01S 17/936* (2013.01)

(58) Field of Classification Search
CPC ............ G02B 28/0816; G02B 26/0816; G01S 7/4817; G01S 7/4813; G01S 17/936
See application file for complete search history.

(56) References Cited

U.S. PATENT DOCUMENTS

| 4,396,254 A | 8/1983 | Shibuya |
| 8,179,580 B2 * | 5/2012 | Iwamatsu ............ G02B 26/127 359/196.1 |

(Continued)

FOREIGN PATENT DOCUMENTS

| DE | 197 31 754 A1 | 2/1999 |
| DE | 102 286 77 A1 | 1/2004 |

(Continued)

OTHER PUBLICATIONS

International Search Report issued in PCT/EP2012/072715 mailed on Feb. 1, 2013 (6 pages).

(Continued)

*Primary Examiner* — Tony Ko
(74) *Attorney, Agent, or Firm* — Osha Liang LLP

(57) ABSTRACT

The invention relates to an optical measuring device (1) comprising a housing (3), in which at least one optical transmitter (20) for emitting at least one transmission beam (22, 24) and at least one optical receiver are arranged, a covering plate (5) closing off the housing and forming a transmission window (10) and a reception window (7), with the at least one transmission beam (22, 24) emerging from the housing through the transmission window (10).
In order to provide a measuring device (1) with an outer surface (14) which is as flat as possible and in order to achieve a reduction in disturbance signals which can be traced back, inter alia, to the reflection of the transmission beam (22, 24) on the transmission window (10), the outer side (5.1) of a covering plate (5) is arranged substantially perpendicular to the emission direction and the transmission window (10) is embodied with a tilt with a predetermined tilt angle (α).

9 Claims, 3 Drawing Sheets

(51) Int. Cl.
  *G02B 26/10* (2006.01)
  *G01S 17/93* (2006.01)

(56) References Cited

U.S. PATENT DOCUMENTS

2007/0058230 A1   3/2007   Blug et al.
2015/0055117 A1*  2/2015   Pennecot ............... G01S 17/89
                                                356/4.01

FOREIGN PATENT DOCUMENTS

| DE | 10 2005 043 931 A1 | 3/2007 |
| DE | 10 2005 055 572 B4 | 8/2007 |
| DE | 10 2010 013 751 A1 | 10/2011 |
| EP | 1 118 874 A2 | 7/2001 |
| EP | 1 308 747 B1 | 3/2007 |
| EP | 1 195 617 B1 | 9/2010 |
| EP | 2 237 065 A1 | 10/2010 |
| WO | 03/087875 A1 | 10/2003 |

OTHER PUBLICATIONS

German Search Report issued in DE 10 2011 119 707.2 mailed on Apr. 4, 2012 (5 pages).

* cited by examiner

OPTICAL MEASURING DEVICE

The invention relates to an optical measuring device of the type set forth in the preamble of claim 1.

The prior art has disclosed scanning optical measuring devices, so-called laser scanners or lidars (light detection and ranging), for vehicles for identifying objects and/or obstacles in a monitored area. These optical measuring devices determine the distance to objects and/or obstacles identified in the monitored area by means of a light pulse travel time method.

The known optical measuring devices comprise a housing, in which at least one optical transmitter for emitting at least one transmission beam and at least one optical receiver are arranged. The receiver receives the beams reflected on objects and/or obstacles and establishes the distance to the objects and/or obstacles from the light pulse travel time. The housing is closed off by a covering plate and forms a transmission window and a reception window, the at least one transmission beam emerging from the housing through the transmission window, and the beam reflected by objects and/or obstacles entering the housing through the reception window.

The optical transmitter usually emits the transmission beam via a rotating deflection mirror, with a transmission beam deflected by the deflection mirror being emitted to the outside through the transmission window. If the deflected transmission beam is directly reflected at the cover plate, said inwardly reflected transmission beam returns back to the deflection mirror, is once again deflected by the deflection mirror and emitted through the transmission window in a different, unwanted spatial direction as a disturbance beam. In order to prevent this emission of disturbance beams, which are likewise reflected by objects and/or obstacles and may thus lead to apparent objects and/or apparent obstacles in a scanned region, the covering plate of the optical measuring device can be arranged with a tilt. By tilting the covering plate, it is possible to avoid direct reflections from being generated at the covering plate and reflected transmission beams from being cast back into the housing interior and being emitted in an unwanted direction via the deflection mirror. By tilting the covering plate, the light beam is reflected past the deflection mirror into the interior of the housing and "runs to death" such that no disturbance radiation or disturbance signals are emitted. What may be considered to be a disadvantage of the angled position of the covering plate is that this predetermines the outer shape of the optical measuring device and defines the sensor installation space. Due to the envisaged installation point of the optical measuring device in the vehicle, i.e. at the front part in front of the radiator, possibly even directly integrated into the radiator grille, the spatial requirements of the optical measuring device should be minimized; in particular, the optical measuring device should have an outer surface which is as flat as possible.

By way of example, the patent document EP 1 308 747 B1 describes a scanning optoelectronic distance sensor. The described distance sensor comprises at least one laser as optical transmitter of pulsed electromagnetic radiation, at least one detector as optical receiver and a protective cover at least partly transmissive to the utilized electromagnetic radiation, with the protective cover being movable and disturbance regions of the protective cover remaining outside of a region of particular interest during the scanning movement. Moreover, the movable protective cover has a tilted passage region with respect to the propagation direction of the electromagnetic radiation.

The patent document DE 10 2005 055 572 B4 describes a scanning optical distance sensor. The described distance sensor comprises at least one laser as optical transmitter, at least one detector as optical receiver and a deflection unit which uses a first mirror to deflect generated electromagnetic radiation to the scene to be measured and uses a second mirror to deflect the laser pulses scattered back from objects to the at least one detector. Here, the first and second mirrors are arranged on a common rotatable shaft which is driven by a drive unit. The first mirror is arranged on a first holder and the second mirror is arranged with axial distance from the first mirror on a second holder, with the drive unit being arranged between the two holders. The at least one laser and the at least one detector with the associated electronics are arranged in a stationary fashion.

It is an object of the invention to develop an optical measuring device of the type set forth in the preamble of claim 1 in such a way that a measuring device with an outer surface that is as flat as possible and with reduced disturbance signals is made available.

According to the invention, this object is achieved by an optical measuring device having the features of claim 1. Further features configuring the embodiments of the invention in an advantageous manner are contained in the dependent claims.

The advantage obtained by the invention consists of it being possible to arrange an outer side of the covering plate substantially perpendicular to the emission direction and only a transmission window, by means of which the transmission radiation is emitted, having a tilt with a predetermined tilt angle such that the beams reflected by the transmission window are not reflected directly onto the deflection mirror in the interior of the optical measuring device.

The basic concept of the invention is based on only the transmission window having a tilt with a defined tilt angle but the covering plate being arranged substantially perpendicular to the emission direction, as a result of which a relatively flat outer surface and a flat design of the optical measuring device are made possible. The disclosed solution according to the invention therefore saves more space than known solutions.

An optical measuring device according to the invention comprises at least one housing, in which at least one optical transmitter for emitting at least one transmission beam and at least one optical receiver are arranged, a covering plate closing off the housing and forming a transmission window and a reception window, with the at least one transmission beam emerging from the housing through the transmission window.

In an advantageous configuration of the optical measuring device according to the invention, the tilt angle of the transmission window can be approximately 7° with respect to the vertical axis. In an advantageous manner, disturbance beams can be effectively reduced at this tilt angle. As a result of the angled position of the plate, the transmission beam reflected on the transmission plate is reflected past the deflection mirror into the interior of the optical measuring device and "runs to death" such that no directly reflected transmission beam leaves the optical measuring device as disturbance beam or disturbance signal. As a result of this, it is possible to obtain an effect which would correspond to a tilt of the whole covering plate by a tilt angle of 7°. The advantage of the embodiments according to the invention consists of it being possible to use the available installation space ideally as a result of the partial tilt.

In a further advantageous configuration of the optical measuring device according to the invention, the transmission window can be tilted inwards or outwards. In the case of an inward tilt, the outer surface of the optical measuring device can be embodied to be flat such that, in the case of an arrangement on the front region of a vehicle, the airflow can continually keep the flat outer surface free from dirt and a deposition of dirt can advantageously be prevented almost entirely. The outward tilt of the transmission window can be selected if the installation space requires this.

In a further advantageous configuration of the optical measuring device according to the invention, the tilting of the transmission window can be, for example, embodied as a thickening dependent on the tilt angle. This enables a simple implementation of the tilted transmission window. By way of example, the thickening can be arranged on the inner side and/or on the outer side of the covering plate.

In a further advantageous configuration of the optical measuring device according to the invention, the transmission window and/or the reception window can have an antireflection coating. As a result, the intensity losses in the electromagnetic radiation when passing through a plate can advantageously be reduced. The light beam has a reflection loss of approximately 4% at every refraction at an air/plate interface; this means that the light intensity reduces by approximately 8% when passing through a plate. By means of an antireflection coating, these losses can be restricted to approximately 1%.

In a further advantageous configuration of the optical measuring device according to the invention, the optical transmitter can be embodied as a laser. A laser advantageously enables outstanding setting of the wavelength and/or pulse duration and/or intensity, and good focusing of the emanating transmission beams.

In a further advantageous configuration of the optical measuring device according to the invention, an optical unit, which, in particular, is embodied as a plane field lens or as an F-theta lens, can be arranged between the optical transmitter and the transmission window. The optical unit can advantageously carry out beam correction. Here, the lens is designed for the focus of the emerging deflected transmission beam. As a result, the range of the laser scanner can advantageously be increased.

In a further advantageous configuration of the optical measuring device according to the invention, at least one transmission mirror unit can be arranged on a rotatable shaft within the housing, the transmission mirror unit comprising at least one transmission deflection mirror and a drive unit which drives the rotatable shaft. The tilted window for avoiding disturbance beams or disturbance signals offers advantages, particularly in the case of optical measuring devices with a transmission mirror unit with a drive unit. In the case of a movable transmission mirror unit, with occurring disturbance beams there is a lack of assignment between the rotor position and reflected light radiation, resulting in the software interpretation based on a rotor position for example defining objects as being arranged on the left-hand side, even though they are situated to the right of the optical measuring device. If direct inward reflections onto the deflection mirror are avoided, it is advantageously possible for additional calculation algorithms to be dispensed with and for the calculation time to be reduced.

In the following, exemplary embodiments of the invention will be explained in more detail on the basis of a drawn representation.

Figure 1:
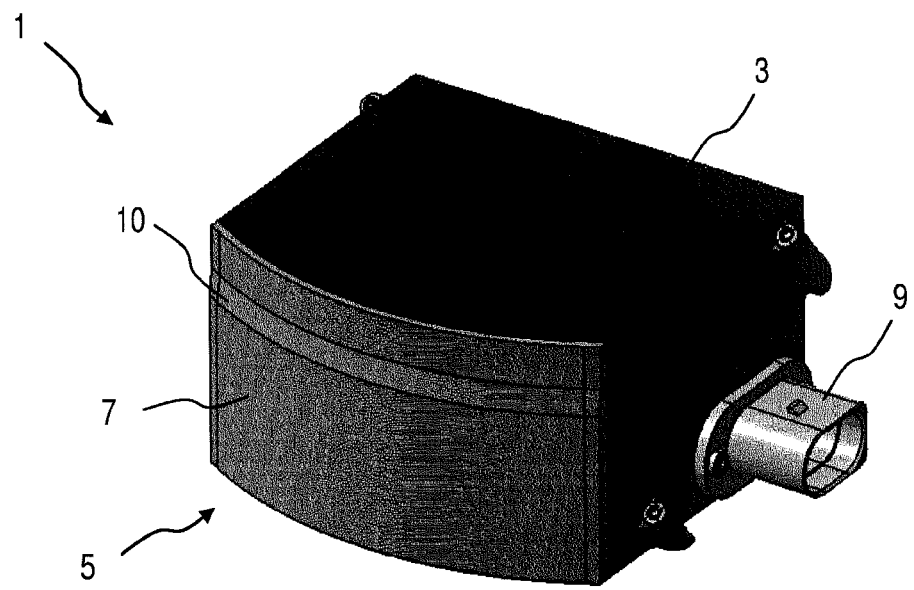
FIG. 1 shows a schematic perspective illustration of an exemplary embodiment of an optical measuring device according to the invention.
Figure 2:
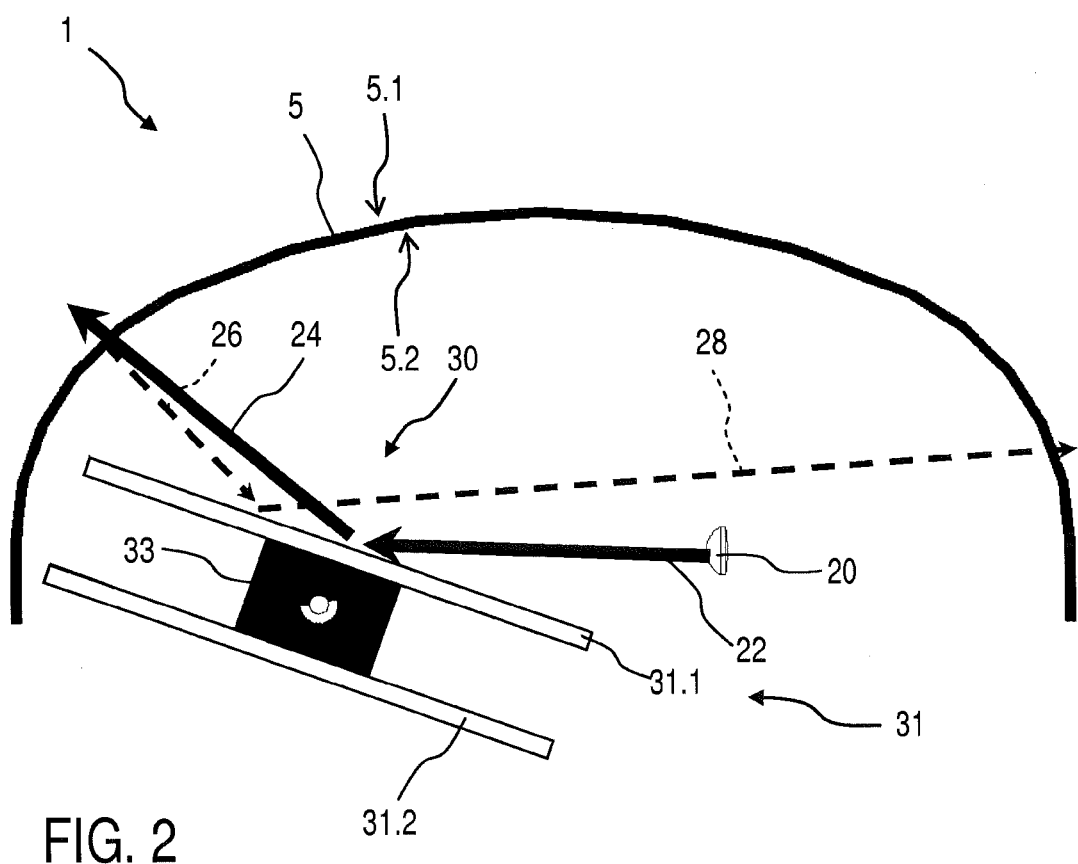
FIG. 2 shows a schematic illustration of an exemplary embodiment of a deflection mirror arrangement for the optical measuring device, according to the invention, from FIG. 1.

As is apparent from FIGS. 1 and 2, an optical measuring device 1 comprises a housing 3 and a covering plate 5, which closes off the housing and forms a transmission window 10 and a reception window 7. A transmission beam 22, 24, for example pulsed laser light, is emitted through the transmission window 10. According to the invention, the covering plate 5 is arranged substantially perpendicular to the emission direction and the transmission window 10 has a tilt with a predetermined tilt angle. Laser light reflected from objects in a monitored area is received through the reception window 7. The distance to objects and/or obstacles identified in a monitored area is calculated using the measured time between the transmission of the transmission beam 22, 24 and the reception of the reflected transmission beam using a light pulse travel time method. In the depicted exemplary embodiment, the covering plate 5, and hence the transmission window 10 and the reception window 7, has an antireflection coating on an outer side 5.1 and an inner side 5.2.

The housing moreover comprises an electrical connector 9, by means of which the optical measuring device 1 can be connected to further components in the vehicle and supplied with energy.

As is furthermore apparent from FIG. 2, an optical transmitter 24 emitting at least one transmission beam 22, 24 is arranged within the housing 3, with the at least one transmission beam 22, 24 emerging from the housing through the transmission window 10. Here, for example, the optical transmitter 20 is embodied as a laser. In the housing 3, at least one transmission mirror unit 31 is arranged on a rotatable shaft. The transmission mirror unit 31 comprises a first transmission deflection mirror 31.1 and a second transmission deflection mirror 31.2, with the transmission deflection mirrors 31.1, 31.2 extending parallel to one another. The transmission deflection mirrors 31.1, 31.2 are fastened to a mirror support 33, which is driven by a drive (not visible here). A transmission beam 22 emanating from the optical transmitter 20 is deflected by one of the transmission deflection mirrors 31.1, 31.2 and the deflected transmission beam 24 is emitted to the outside through the transmission window 10. Without the tilt of the transmission window 10 according to the invention, part 26 of the deflected transmission beam 24 can be reflected directly on the transmission window 10. The reflected beam 26 is then deflected by one of the transmission deflection mirrors 31.1, 31.2 and emitted to the outside in an unwanted spatial direction through the transmission window as deflected reflected disturbance beam 28.

This deflection of the reflected beam 26 is avoided by virtue of the transmission window 10 being embodied with the tilt by a predetermined tilt angle. As a result of this, the deflected transmission beam 24 is reflected on the transmission window 10 in such a way that the reflected beam 26 is not reflected directly onto the deflection mirror 31.1, 31.2 and "runs to death". Therefore, no disturbance beam 28 can leave the optical measuring device 1, the beams of which disturbance beam reflected at objects and/or obstacles possibly having a negative influence on the evaluation result.

In one exemplary embodiment (not depicted here), an optical unit is arranged between the optical transmitter 20 and the transmission window 10, which optical unit focuses the deflected transmission beam 24 and therefore increases the range of the optical measuring device 1. By way of example, this optical unit can be embodied as a plane field lens or as an F-theta lens.

As is furthermore apparent from FIGS. 1 to 5, an outer side 5.1 of the covering plate 5 is substantially perpendicular to the emission direction and, according to the invention, the transmission window 10 has a tilt with a predetermined tilt angle $\alpha$.

Figure 3:
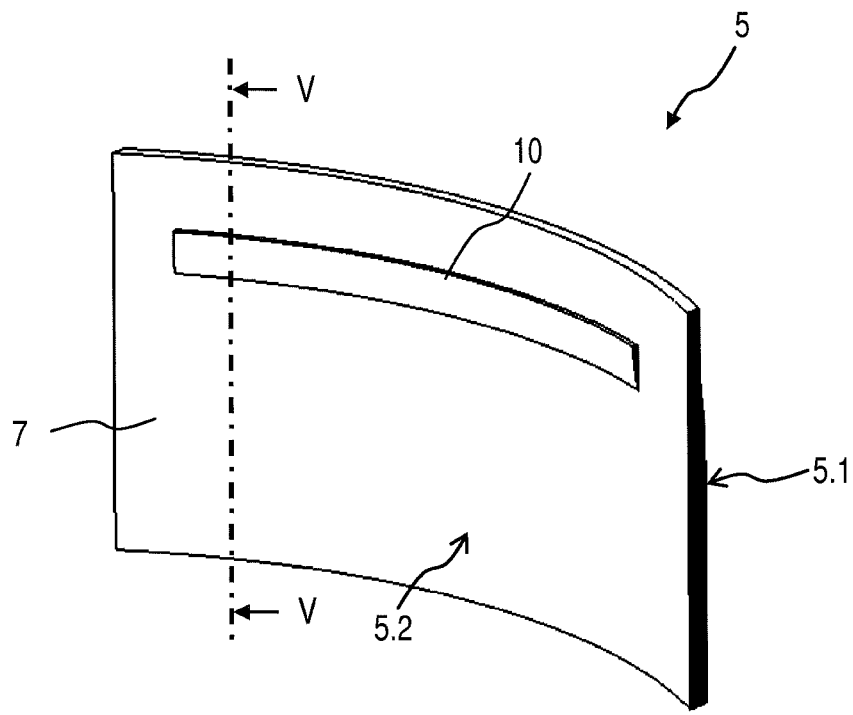
FIG. 3 shows a schematic perspective rear view of a covering plate for the optical measuring device, according to the invention, from FIG. 1.
Figure 4:
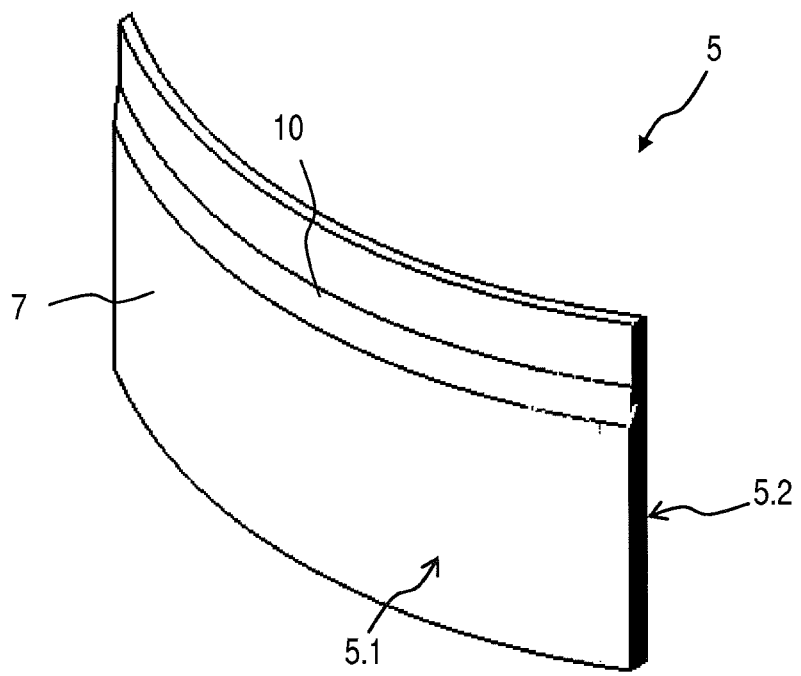
FIG. 4 shows a perspective front view of the covering plate for the optical measuring device, according to the invention, from FIG. 1.
Figure 5:
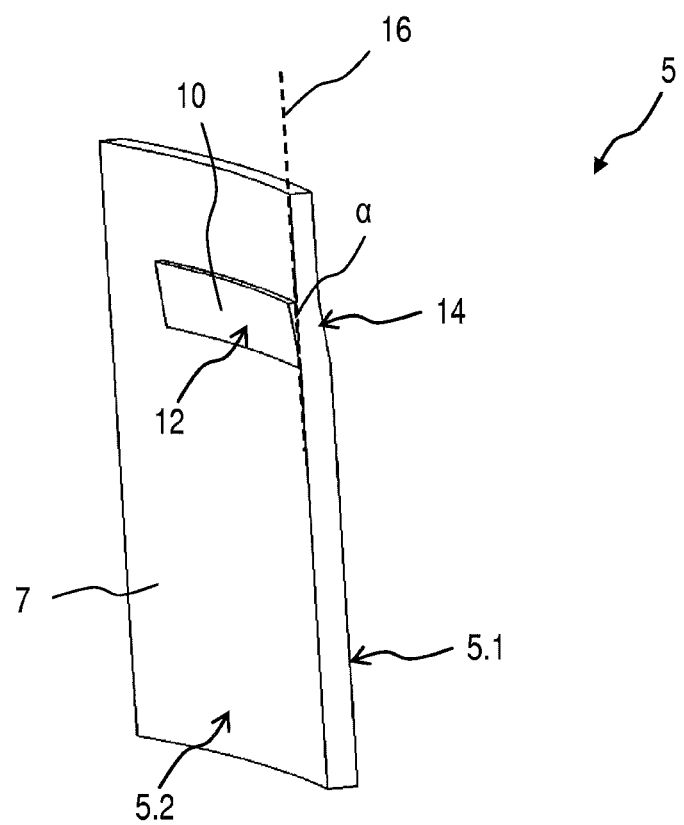
FIG. 5 shows a perspective sectional illustration of the covering plate along the line IV from FIG. 3.

As is furthermore apparent from FIGS. 3 to 5, the tilt angle $\alpha$ of the transmission window 10 is preferably approximately 7° with respect to the vertical axis 16. In the depicted exemplary embodiment, the transmission window 10 is tilted inwards and has a thickening dependent on the tilt angle $\alpha$, which thickening projects from an inner side 5.2 of the covering plate 5.

Moreover, the outer side 5.1 of the covering plate 5 is tilted inwards in the region of the transmission window 10 such that the thickness of the covering plate 5 tapers towards the transmission window 10. The outer side 5.1 of the covering plate 5 is arranged to be flat and perpendicular to the emission direction. The covering plate 5 only has a tilt in the region of the transmission window 10 such that the beams 26 reflected at the transmission window 10 are not reflected directly onto one of the deflection mirrors 31.1, 31.2.

In an alternative exemplary embodiment (not depicted here), the transmission window 5 can be tilted towards the outside and/or project towards the outside.

The invention claimed is:

1. An optical measuring device, comprising:
   a housing, in which at least one optical transmitter for emitting at least one transmission beam and at least one optical receiver are arranged;
   a covering plate closing off the housing and forming a transmission window and a reception window, with the at least one transmission beam emerging from the housing through the transmission window,
   wherein an outer side of the covering plate is substantially perpendicular to the emission direction, wherein the transmission window has a tilt with a predetermined tilt angle, and wherein the transmission window has a thickening dependent on the predetermined tilt angle.

2. The device according to claim 1, wherein the predetermined tilt angle of the transmission window is approximately 7° with respect to the vertical axis.

3. The device according to claim 1, wherein the transmission window is tilted inwards or outwards by the predetermined tilt angle.

4. The device according to claim 1, wherein the thickening is formed on an inner side and/or on the outer side of the covering plate.

5. The device according to claim 1, wherein the transmission window and/or the reception window have an antireflection coating.

6. The device according to claim 1, wherein the at least one optical transmitter is embodied as a laser.

7. The device according to claim 1, wherein an optical unit is arranged between the optical transmitter and the transmission window.

8. The device according to claim 7, wherein the optical unit is embodied as a plane field lens or as an F-theta lens.

9. The device according to claim 1, wherein at least one transmission mirror unit is arranged on a rotatable shaft within the housing, the transmission mirror unit comprising at least one transmission deflection mirror and a drive unit which drives the rotatable shaft.

\* \* \* \* \*